March 5, 1935.　　　D. HEYER　　　1,993,547
VARIABLE SPEED TRANSMISSION DEVICE
Filed March 3, 1931　　2 Sheets-Sheet 1
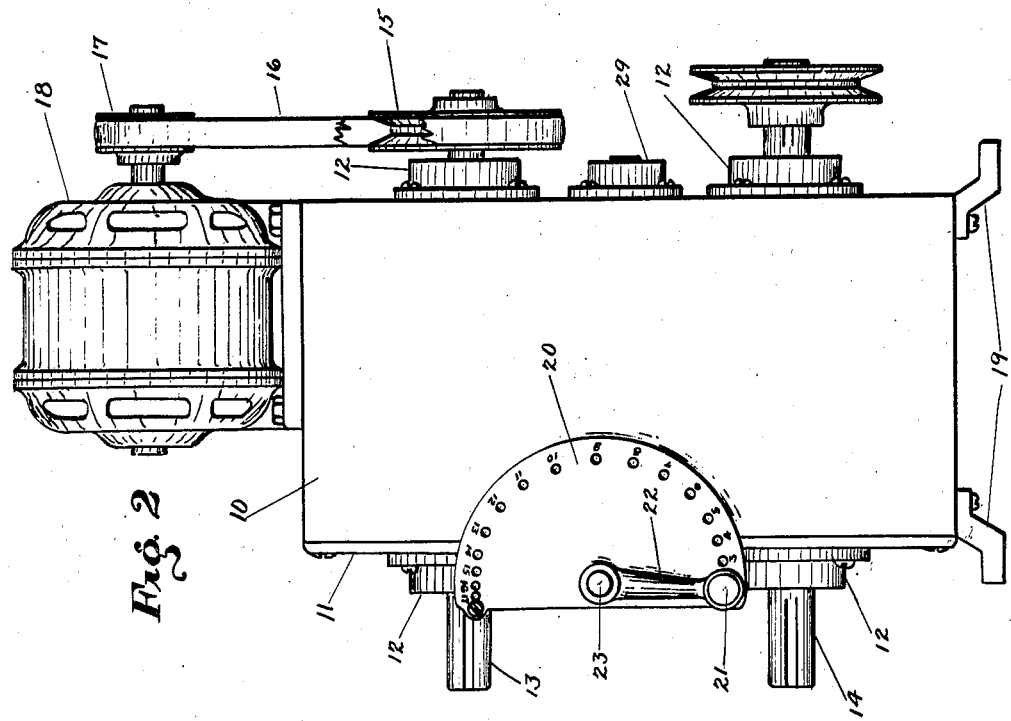
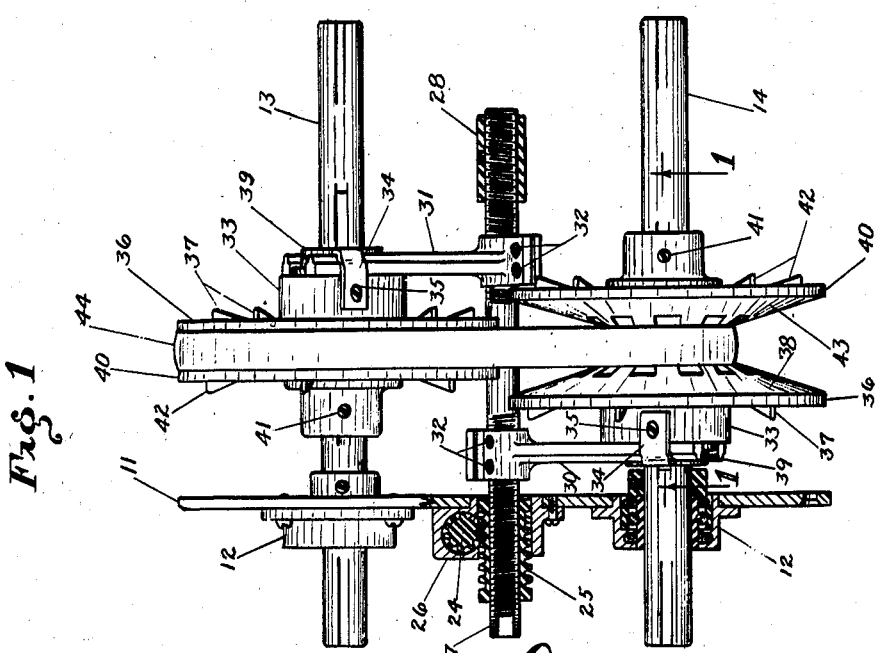
Don Heyer Inventor March 5, 1935.  D. HEYER  1,993,547
VARIABLE SPEED TRANSMISSION DEVICE
Filed March 3, 1931    2 Sheets-Sheet 2
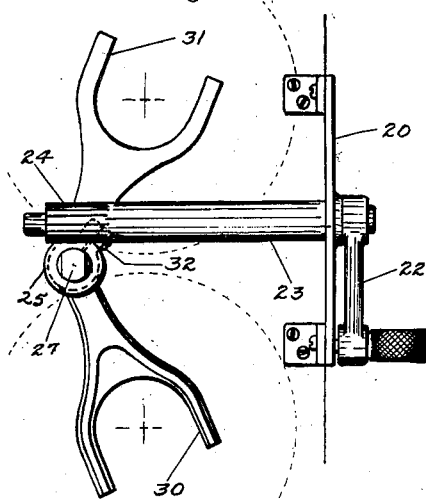
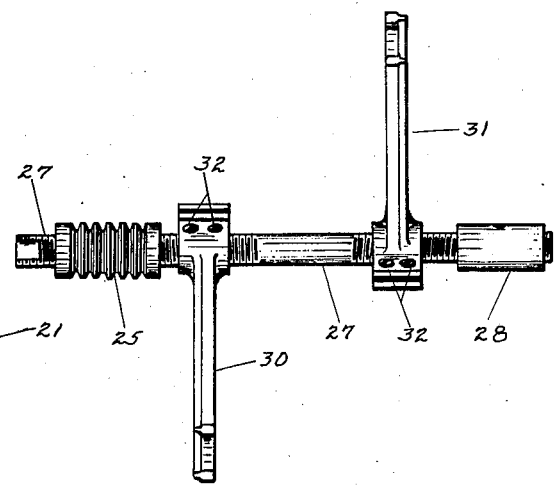
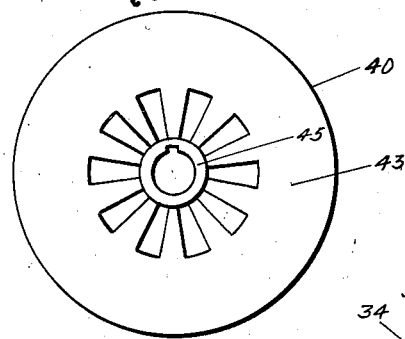
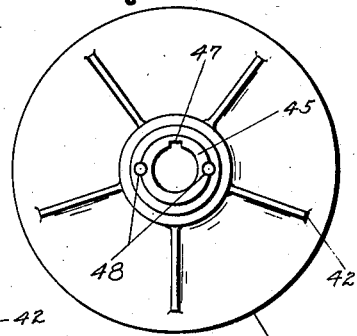
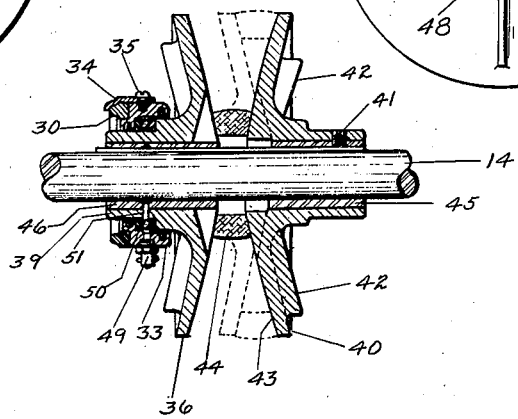
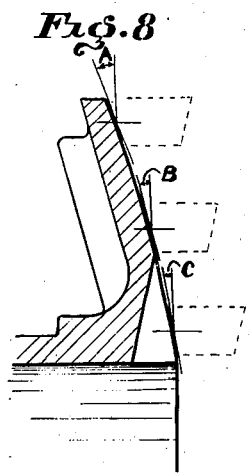
Inventor
Don Heyer Patented Mar. 5, 1935

1,993,547

UNITED STATES PATENT OFFICE 1,993,547

VARIABLE SPEED TRANSMISSION DEVICE

Don Heyer, Los Angeles, Calif., assignor to United States Electrical Manufacturing Company, Los Angeles, Calif., a corporation of California Application March 3, 1931, Serial No. 519,764

18 Claims. (Cl. 64—8)

My invention relates to improvements in variable speed transmission devices whereby the construction, operation and adjustment is greatly simplified and the proper tension maintained on the flexible driving element at all times.

Previously known devices of this character have employed complicated speed control and adjusting mechanisms and have disregarded the changing tension of the belt when shifted from one position to another. It will be readily seen that when the belt is running at either extreme speed change, that is, on the minimum effective diameter of one pair of pulleys and the maximum effective diameter of the other pair of pulleys, it necessitates a longer belt than when the belt is running on effective diameters of the same size. Otherwise the belt will be too tight at some points and too loose at others, unless arrangements are made to take care of this changing tension in proportion to the speed change.

An object of this invention is the provision of a variable speed transmission device capable of effecting infinite speed changes without interrupting the operation of the driven mechanism and at the same time maintaining the proper tension on the flexible driving element throughout the speed range regardless of the ratio of speed changes, by means of the curved or angular effective surface forming a seat for the flexible driving element.

Another object of this invention is to provide a variable speed transmission mechanism of such arrangement that a maximum number of speed changes may be attained with equal frictional torque at all effective diameters by the curved or angular effective surface which forms a seat for the flexible driving element.

Another object of the present invention is to provide a suitable mechanism which may be used alone or in multiple to effect a variable speed between the source of power and the driven device.

A further object of this invention is to provide a simple, efficient and economical construction of a variable speed transmission mechanism suitably housed and arranged to facilitate assembly, inspection and repair.

A still further object of this invention is to provide a simple control and belt adjusting mechanism consisting of a minimum of parts.

A still further object of this invention is the provision of a telescoping pulley construction that can be readily cast, including fan blades on the outer surface for the circulation of air through the device to carry off the heat generated by the thrust bearings and flexible driving element.

A still further object of this invention is to provide a pulley bushing arrangement whereby a maximum of slidable surface is provided for the adjustable pulley member on the feathered keys of the longitudinal shafts.

My invention possesses many other improvements and advantages over present mechanism of this nature and has objects which may be made more easily apparent from a consideration of one form of my invention. For this purpose I have shown one arrangement in the drawings which accompany and form a part of the present specification. I shall now proceed to describe this form in detail, which illustrates the general principles of my invention; but it is to be understood that this description is not to be taken in a limiting sense, since the scope of my invention is best defined by the appended claims.

In the drawings:

Figure 1 is a view showing the interior arrangement of one form of mechanism all mounted on a removable cover which is readily detachable from the housing. Certain portions are shown in section to clearly illustrate the control and bearing arrangement.

Figure 2 is a side elevation of the completed assembly.

Figure 3 is a side view of the control mechanism arrangement in detail, clearly showing the shifting forks, control lever and pinion shaft, the pinion gear engaging the circular rack gear on the control rod.

Figure 4 is a plan view showing certain parts of the control or shifting mechanism.

Figure 5 is a front view of one of the pulley members showing the effective surface which is partially slotted for a certain distance to engage with its complementary pulley member in proper relation.

Figure 6 is a back view of one pulley member showing the fan blades for circulating air through the device and also shows the manner in which the keywayed bushing is secured in the hub of the pulley member.

Figure 7 is a longitudinal sectional view taken as indicated by line 1—1 in Figure 1.

Figure 8 is an enlarged fragmentary sectional view of one of the pulley members.

Referring more in detail to the accompanying drawings and especially to Figures 1 and 2, numeral 10, designates the housing of my novel variable speed transmission device. The housing 10, supports and contains the mechanism, whereas 11 is the cover, 12 suitable means in which shafts 13 and 14 are journaled. Shaft 13 is shown as the drive or constant speed shaft receiving power from pulley 15 by belt 16, driven by 17, on the shaft of motor 18. This shaft may be connected direct to the prime mover or in any suitable manner. Shaft 14 is shown as the driven or variable speed shaft from which power is applied by pulley, or other suitable means. Mounting feet or brackets 19, support the device. A graduated control plate 20, secures the end of handle 21, at the desired speed changes effected by moving lever 22, which turns shaft 23. Shaft 23 has a pinion gear on one end engaging with circular rack gear 25, contained together with pinion shaft 23, in suitable bearing support 26. The circular rack gear 25, is threaded on the inside and screws on to the control rod 27. One end of control rod 27, has a right hand thread and may be machined to take a wrench or other suitable tool to rotate rod 27 for belt adjustment, and the other end of same has a left hand thread with a suitable bushing 28, at the extreme end slidably mounted in support 29. Control rod 27, has shifting forks, 30 and 31 with respective right and left hand threads to adjust the pulley members. Forks 30 and 31 are held under tension by screws 32, in the clamp end of the forks retarding the rotation of the rod 27, during speed changes which are effected by a longitudinal movement of same, decreasing the effective diameter of one pair of telescoping pulleys and increasing the effective diameter of the other pair of telescoping pulleys proportionally. However, the screws 32, do not clamp the shifting fork threaded ends under tension so great as to retard the rotation of the rod 27, by a suitable tool on the flattened end. Shifting forks 30 and 31 are attached and bear against thrust bearing containers 33, on their respective forked ends and are secured in place by bracket 34, and screw 35, on each adjustable pulley member. Numerals 36 designate the adjustable pulley members which have fan blades 37 on their outer surface and have a curved or angular effective surface on their inner face 38. Thrust bearing container 33 is mounted on a suitable hub shown at 39. Adjustable pulley members 36 are slidably mounted on shafts 13 and 14 which have suitable keys or engaging means with key-ways or other slidable connection with pulley members 36. Numerals 40 are the stationary pulley members which remain in a fixed position on shafts 13 and 14 by set screws 41 or other suitable means. On their outer surface pulley members 40, have fan blades 42, and have a curved or angular effective surface on their inner face 43. Numeral 44 is the flexible driving element shown as a V belt, but I do not wish to limit myself to the use of such an element as I find other driving elements satisfactory. Frictional contact on the sides of the flexible driving element by the curved or angular effective surfaces 38 and 43, transmit the power from the driving to the driven element. In the Figures 5, 6, and 7, the short bushing 45 in the stationary pulley member has a suitable key-way 47, and securing means 48, in the hub of the pulley member together with the set screw 41, which tends to hold the bushing 45 in the hub and also secures the stationary pulley member to the shafts 13 and 14. The longer bushing 46 has suitable key-ways as shown in bushing 45, and similar securing means 48, which is contained in the hub of the adjustable pulley member 36. This construction provides a maximum of slidable and driving surface for the adjustable pulley member 36, in a limited space, and as this member has the greatest wear and binding action caused by shifting the belt 44 from a minimum to a maximum effective diameter, it is essential that it have a maximum of slidable and wearing surface. Lubrication is supplied through fitting 49 to thrust bearing 50, continuing through passage 51, communicating through hub 39 and bushing 46. Suitable oil grooves are machined in the bushing 46 to properly distribute the lubrication along the inner surface of this bushing.

It will be seen that a wide range of speed changes are available which are secured by shifting the opposite member of each pair of pulleys from a minimum to a maximum effective diameter and the belt is maintained at the proper tension in each position by the curved or angular effective surface. This is due to the wider angle being at the periphery of the pulley, the proper angle being used to accomplish the desired result. I have also found that by using a more acute included angle at the minimum effective diameter than the included angle of the V belt a greater frictional torque is effected, due to the increased wedging action. This is a very desirable feature, as the frictional surface decreases, the included angle of the pulley may be decreased in proportion to maintain the proper frictional torque at all effective diameters.

I claim:—

1. In an adjustable speed drive mechanism, in which there are two pulley structures and a belt connecting the structures for transmitting power from one structure to the other structure, and in which each pulley structure has one axially fixed section and an axially movable section, the sections having opposed inclined faces, forming, by adjustment of one section in an axial direction, variable effective pulley diameters, the combination therewith of a common means for shifting both movable sections so as to increase the effective diameter of one pulley structure and to decrease the effective diameter of the other pulley structure, and means for increasing or decreasing both effective pulley diameters for taking up belt slack, said latter means cooperating with said common means to provide simultaneous adjustment of both pulley diameters.

2. In an adjustable speed drive mechanism, in which there are two pulley structures and a belt connecting the structures for transmitting power from one structure to the other structure, and in which each pulley structure has a pair of relatively adjustable sections with opposed inclined faces forming, by adjustment, variable effective pulley diameters, the combination therewith of a common means for simultaneously adjusting both pulley structures, so as to increase the effective diameter of one pulley structure and to decrease the effective diameter of the other pulley structure, and means for increasing or decreasing both effective pulley diameters for taking up belt slack, said latter means cooperating with said common means to provide simultaneous adjustment of both pulley diameters.

3. In an adjustable speed drive mechanism, in which there are two pulley structures and a belt connecting the structures for transmitting power from one structure to the other structure, and in which each pulley structure has one axially fixed section and an axially movable section, the sections having opposed inclined faces, forming, by adjustment of one section in an axial direction, variable effective pulley diameters, the axially movable section of one structure being opposite the axially fixed section of the other structure, the combination therewith of a rod movable in a direction parallel to the axes of the pulley structures for simultaneously moving both axially movable sections to increase the effective pulley diameter of one pulley structure and to decrease the effective pulley diameter of the other structure, and means whereby a rotation of said rod operates simultaneously to increase or to decrease both effective pulley diameters for taking up belt slack.

4. In an adjustable speed drive mechanism in which there are two pulley structures and a belt connecting the structures for transmitting power from one structure to the other structure, and in which each pulley structure has one axially fixed section and an axially movable section, the sections having opposed inclined faces, forming, by adjustment of one section in an axial direction, variable effective pulley diameters, the axially movable section of one structure being opposite the axially fixed section of the other structure, the combination therewith of a rod movable in a direction parallel to the axes of the pulley structures, said rod having two screw threads thereon of opposite pitch, and a pair of shift members respectively engaged by said threads and respectively arranged axially to move pulley sections, whereby axial movement of the rod causes opposite variation in the effective diameters of the pulley structures, and rotation of the rod simultaneously increases or decreases both effective pulley diameters for taking up belt slack.

5. In an adjustable pulley structure on a shaft, having relatively axially movable sections, said sections having opposed inclined faces, forming, by adjustment, variable effective diameters, and also having interengaging slots and projections to permit the sections to be brought close together for providing a large maximum diameter setting, the combination therewith of a bearing bushing slidable on the shaft and located in a section that is movable on the shaft, said bushing being adapted to enter beneath the projections of the other section.

6. In an adjustable pulley structure on a shaft, having relatively axially movable sections, said sections having opposed inclined faces, forming, by adjustment, variable effective diameters, and also having interengaging slots and projections to permit the sections to be brought close together for providing a large maximum diameter setting, the combination therewith of a bearing bushing in each of the sections, said bushings each having a keyway for preventing relative rotation of the sections and the shaft, and means capable of being utilized after the sections are assembled on the shaft, for fastening the bushings in the hubs of the sections.

7. In a variable speed transmission device, a housing having an aperture and a removable cover therefor, as well as a wall opposite the cover, and a variable speed mechanism in the housing, said mechanism having shafts with bearing supports in the wall, but supported on the cover, said aperture being of sufficient size to pass the mechanism through the aperture by a continuous undirectional separating movement of the cover from the housing, whereby the cover and the mechanism except for the bearings in the wall, can be removed from the housing as a unit.

8. In an adjustable speed drive mechanism, in which there are two pulley structures and a belt connecting the structures for transmitting power from one structure to the other structure, and in which each pulley structure has one axially fixed section and an axially movable section, the sections having opposed inclined faces, forming, by adjustment of one section in an axial direction, variable effective pulley diameters, the axially movable section of one structure being opposite the axially fixed section of the other structure, the combination therewith of a circular rack having an internal thread, a pinion engaging the rack, a rod threaded inside of the rack, said rod having two sets of external screw threads of opposite direction of pitch, shift levers engaging said sets of threads respectively, and respectively operating the axially movable pulley sections.

9. In a variable speed transmission device, a housing having a removable cover, as well as a wall opposite the cover, and a variable speed mechanism in the housing, said mechanism including a shaft, and a pulley structure on the shaft having a pair of sections with opposed inclined faces, said sections being relatively movable on the shaft in an axial direction, and means for supporting said mechanism on the cover so that the cover and the pulley structure can be removed from the housing as a unit.

10. In a variable speed drive mechanism, a housing, and a variable speed mechanism in the housing, said mechanism including a wedge shaped belt, a shaft, a pulley structure on the shaft having a pair of sections with opposed inclined faces, for contacting with the opposite sides of the belt, said sections being relatively movable on the shaft in an axial direction, and fan blades attached to the reverse side of at least one of the sections.

11. In a variable speed power transmission device, a shaft, an adjustable pulley structure mounted on said shaft, said adjustable pulley structure including a pair of pulley sections having opposed inclined belt engaging faces, forming by relative axial adjustment variable effective pulley diameters, means adjusting the relative axial position of said pulley sections, a housing enclosing said pulley structure, said housing having a removable cover, and rotatably supporting means in said cover for said shaft whereby the shaft and the associated pulley structure together with said axially adjusting means may be removed from the housing as a unit.

12. In a variable speed power transmission device in combination, a shaft, an adjustable pulley structure mounted on said shaft, said adjustable pulley structure including a pair of pulley sections having opposed inclined belt engaging faces, forming by relative axial adjustment variable effective pulley diameters, one of said pulley sections including means for attaching said pulley section to said shaft in any desired axial position, means maintaining the adjusted relatve axial position of said pulley sections, a housing enclosing said pulley structure, said housing having a removable cover, and means cooperating with said cover for rotatably supporting said shaft, whereby said cover, shaft, its associated pulley structure, and maintaining means may be assembled as a unit outside of said housing.

13. In an enclosed variable speed drive mechanism, a driving shaft and a driven shaft, a pair of adjustable pulley structures respectively in axial driving relation to each of said shafts, each of said pulley structures including a pair of pulley sections having opposed inclined belt engaging faces forming by relative axial adjustment variable effective pulley diameters, a housing enclosing said pulley structures, means adjusting the relative axial position of at least one of the pulley sections comprising one of said pulley structures, means external of said housing actuating said axially adjusting means, a removable cover provided for said housing, speed indicating means supported by said cover and actuated in accordance with the axial adjustment of one of said pulley structures, and means for supporting the pulley structure actuating said speed indicating means on said cover, whereby said cover may be removed from the housing together with the adjustable pulley structure and the speed indicating means actuated thereby.

14. In a variable speed transmission device, a housing having means forming a removable cover, as well as a wall opposite the cover, and a variable speed mechanism in the housing, said mechanism including a shaft, and a pulley structure on the shaft having a pair of sections with opposed inclined faces, said sections being relatively movable on the shaft in an axial direction, the axis of the shaft being substantially parallel to the direction of the motion of the cover when removing it from the housing, and means for supporting said mechanism on the cover so that the cover and the pulley structure can be removed from the housing as a unit, by a continuous movement of the cover from the housing in a direction substantially parallel to the axis of the pulley structure.

15. In a variable speed transmission, a housing having a removable cover and a variable speed mechanism in the housing, said mechanism including a shaft, and a pulley structure on the shaft having a pair of pulley sections with opposed inclined faces, said sections being relatively axially movable, bearing means for rotatably supporting said shaft, and means forming a bearing housing on said removable cover for said bearing means.

16. The structure as set forth in claim 2, with the addition of a housing for enclosing and supporting said adjustable pulley structures, and in which said means for taking up belt slack is operable from the exterior of said housing.

17. In an adjustable speed drive, a wedge shaped belt, an adjustable pulley structure in active driving relation to said belt, said adjustable pulley structure having a pair of pulley sections with opposed inclined belt engaging faces, forming by relative axial adjustment variable effective pulley diameters, a shaft in coaxial driving relation to said pulley structure, and fan means driven by said shaft for producing a circulation of cooling air for said belt and pulley structure, said fan means including fan blades attached to the reverse side of at least one of said pulley sections.

18. In an adjustable speed drive, a wedge shaped belt, an adjustable pulley structure in active driving relation to said belt, said adjustable pulley structure having a pair of pulley sections with opposed inclined belt engagng faces, forming by relative axial adjustment variable effective pulley diameters, a shaft in coaxial driving relation to said pulley structure, and fan means driven by said shaft for producing a circulation of cooling air for said belt and pulley structure, said fan means including fan blades attached to the reverse side of at least one of said pulley sections, said fan blades being formed integral with said pulley section and extending substantially to the external periphery of the pulley section.

DON HEYER.